United States Patent
Brandwine (10) Patent No.: US 11,216,391 B1
(45) Date of Patent: Jan. 4, 2022

(54) USING AN I/O PROXY DEVICE TO FILTER I/O MESSAGES IN A COMPUTER SYSTEM

(71) Applicant: Amazon Technologies, Inc., Seattle, WA (US)

(72) Inventor: Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/015,090

(22) Filed: Jun. 21, 2018

(51) Int. Cl.
  *G06F 13/10* (2006.01)
  *G06F 9/54* (2006.01)
  *G06F 13/36* (2006.01)

(52) U.S. Cl.
  CPC ............ *G06F 13/102* (2013.01); *G06F 9/547* (2013.01); *G06F 13/36* (2013.01)

(58) Field of Classification Search
  CPC ......... G06F 13/36; G06F 13/102; G06F 9/547
  See application file for complete search history.

(56) References Cited

U.S. PATENT DOCUMENTS

| | | | | |
|---|---|---|---|---|
| 6,161,152 A * | 12/2000 | Garg | ...................... | G06F 13/22 709/224 |
| 9,424,067 B2 | 8/2016 | Liguori et al. | | |
| 2009/0094391 A1 * | 4/2009 | Yim | ..................... | G06F 12/0804 710/57 |
| 2013/0152088 A1 * | 6/2013 | Gkantsidis | .............. | G06F 16/24 718/100 |
| 2014/0223096 A1 * | 8/2014 | Yang | .................... | G06F 12/0871 711/114 |
| 2015/0347017 A1 * | 12/2015 | Shacham | .............. | G06F 3/0688 711/103 |
| 2019/0042781 A1 * | 2/2019 | Lukacs | ................... | G06F 21/80 |

* cited by examiner

*Primary Examiner* — Nimesh G Patel
(74) *Attorney, Agent, or Firm* — Nicholson De Vos Webster & Elliott LLP (57) ABSTRACT

Techniques are described for the creation and use of input/output (I/O) filters used to perform actions relative to I/O requests passing through an I/O proxy device of a computer system. A computer system includes one or more hardware processing elements (for example, one or more central processing units (CPUs), graphics processing units (GPUs), or other types of processing elements), one or more data storage devices (for example, hard-disk drives, solid-state drives (SSDs), network-accessible block storage devices, and so forth), and an I/O proxy device that is interposed between at least one of the hardware processing elements and at least one of the one or more data storage devices. The interposition of an I/O proxy device between hardware processing elements and data storage devices enables the I/O proxy device to participate in the I/O data path, for example, to receive I/O messages and to perform various actions relative to such messages.

20 Claims, 7 Drawing Sheets

USING AN I/O PROXY DEVICE TO FILTER I/O MESSAGES IN A COMPUTER SYSTEM

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media are described for the creation and use of input/output (I/O) filters used to perform actions relative to I/O messages passing through an I/O proxy device of a computer system. According to some embodiments, a computer system includes one or more hardware processing elements (for example, one or more central processing units (CPUs), graphics processing units (GPUs), or other type of processing elements), one or more data storage devices (for example, hard disk drives (HDDs), solid-state drives (SSDs), network-accessible block storage devices, and so forth), and an I/O proxy device that is interposed between at least one of the hardware processing elements and at least one of the one or more data storage devices. In general, the interposition of an I/O proxy device between hardware processing elements and data storage devices enables the I/O proxy device to participate in a computer system's I/O data path, for example, by receiving I/O messages generated by system components—for example, read and write requests—and performing various actions relative to such messages. In various embodiments, the types of actions that can be performed by an I/O proxy device relative to I/O messages received by the I/O proxy device can include, for example, encrypting or decrypting the messages, converting the messages to a different format, and applying customizable I/O filters to the messages, as described herein.

According to embodiments described herein, an I/O proxy device includes its own hardware processing elements, memory, and possibly other components that are independent from other components of a computer system of which it is a part (for example, a server). These components of the I/O proxy device enable the device to execute software providing, among other functionality, I/O filter management that allows users to create, modify, and remove I/O filters stored in memory of the I/O proxy device, and the ability to apply configured I/O filters to I/O messages received by the I/O proxy device. In some embodiments, an I/O filter includes data defining one or more conditions against which I/O messages received by the I/O proxy device are tested, and further includes data identifying one or more actions to be performed by the I/O proxy device when the one or more associated filter conditions are satisfied by an I/O message.

As one example, an I/O filter can specify a pattern of data using a regular expression or other type of search pattern and, when data contained in an I/O message matches the pattern, one or more corresponding actions specified by the I/O filter are performed by the I/O proxy device (for example, the I/O message can be denied, the matching data can be masked or tokenized, log data can be generated, and so forth).

In general, I/O is an integral aspect of virtually any computer system and most computer systems interface with one or more data storage devices during operation. A computer system that is used to execute software implementing a web server or database server, for example, may frequently encounter operations that involve writing or reading data from one or more data storage devices coupled to the computer system. For example, the I/O operations may be used to retrieve files representing web pages to be served by a web server, to store records in a database, to store or retrieve log data, among many other possible reasons for accessing a data storage device. These types of software applications and others often include logic intended to prevent various types of undesirable activity involving data stored on data storage devices. However, virtually all software applications and computer systems are nevertheless susceptible to various types of misuse and other security issues. If a computer system is infected with a virus or a malicious user gains access to the system, for example, software running on the system may attempt to modify data stored at a data storage device in undesirable ways, attempt to exfiltrate sensitive data stored on a data storage device, or perform other undesirable operations. Within such computer systems, the software itself is often the last line of defense for mitigating these types of issues, and any resulting I/O requests issued by an operating system (OS) are generally passed to I/O devices by the underlying hardware with impunity. Among other benefits, the ability to configure an I/O proxy device as described herein to perform various types of I/O filtering, independent of other hardware and software involved in the I/O data communications paths of a computer system, can help prevent some of the undesirable behavior and vulnerabilities present in computer systems.

Figure 1:
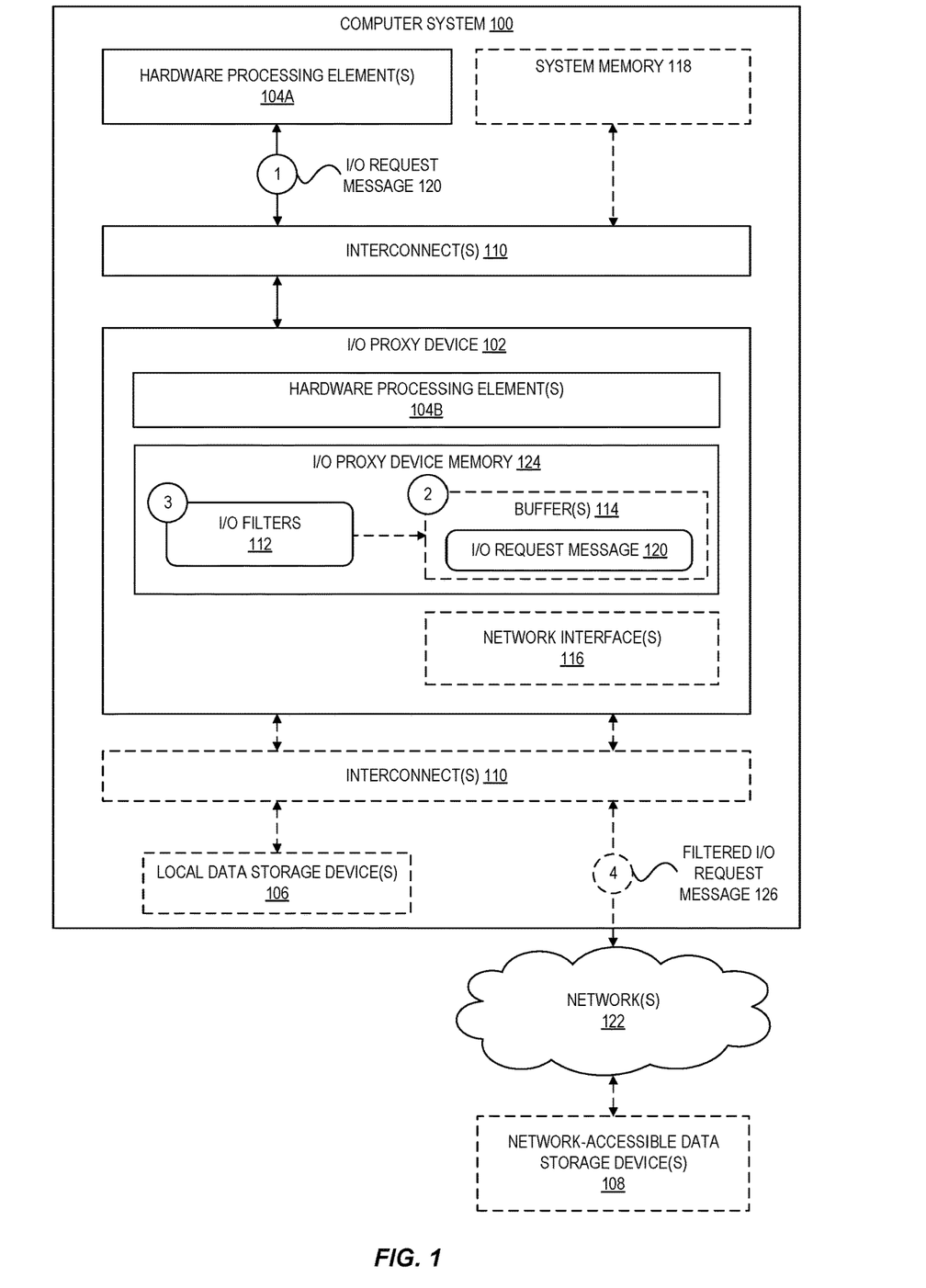
FIG. 1 is a block diagram illustrating a computer system (for example, a server) including an I/O proxy device that uses I/O filters to perform various actions relative to I/O request messages generated by a compute instance (for example, a virtual machine (VM) instance) running on the computer system and that is directed to a local or remote data storage device according to some embodiments.

FIG. 1 is a block diagram illustrating a computer system including an I/O proxy device that uses I/O filters to perform various actions relative to I/O messages generated by compute instances running on the computer system and that are directed to local or remote data storage devices coupled to the computer system. As shown in FIG. 1, a computer system 100 includes one or more hardware processing elements 104A, system memory 118, interconnect(s) 110, at least one I/O proxy device 102 (which itself includes one or more hardware processing elements 104B), and one or more local data storage device(s) 106, network-accessible data storage device(s) 108, or both.

In an embodiment, a hardware processing element 104A is generally any type of processor capable of executing instructions. For example, in various embodiments, a hardware processing element 104A is a general-purpose or embedded processor implementing any of a variety of instruction set architectures (ISAs), such as the x86, ARM, PowerPC, SPARC, or MIPS ISAs, or any other suitable ISA. In multiprocessor systems, each of hardware processing elements 104A may commonly, but not necessarily, implement the same ISA. In embodiments with multiple hardware processing elements 104A, each processing element can have a dedicated bank of system memory 118 or share system memory 118 with other hardware processing elements 104A. In some embodiments, a hardware processing element 104A accesses system memory 118 via a memory bus (not shown) or via an interconnect 110. A hardware processing element 104A can include one or more processor cores, each having one or more levels of dedicated or shared cache (for example, L1 cache, L2 cache, and so forth).

In an embodiment, system memory 118 stores program instructions and other data accessible by hardware processing elements 104A. Program instructions and data correspond to one or more desired functions, depending on the various service(s) being performed by computer system 100. In other embodiments, program instructions and/or data may be received, sent, or stored on different types of computer-accessible media. In various embodiments, system memory 118 may be implemented using any suitable computer-accessible storage medium. Generally speaking, a computer-accessible storage medium may include non-transitory storage media or memory media such as magnetic or optical media, for example, disk or DVD/CD coupled to computer system 100 via interconnect 110. A non-transitory computer-accessible storage medium may also include any volatile or non-volatile media such as random-access memory (RAM) (for example, SDRAM, static RAM, dynamic RAM (DRAM), double data rate (DDR) SDRAM, and the like), read only memory (ROM), or other non-volatile memory (for example, Flash). Computer-accessible media may include transmission media or signals such as electrical, electromagnetic, or digital signals, conveyed via a communication medium such as a network and/or a wireless link, such as may be implemented via a network interface. In such cases, a computer system 100 may access program instructions and data from a remote computer-accessible storage medium via the computer-accessible media.

In an embodiment, a computer system 100 optionally includes one or more network interface(s) (not shown) that allow data to be exchanged between the computer system 100 and other electronic devices attached to a network or networks 122, such as other computer systems or hardware within a service provider network of which the computer system 100 is a part. In some embodiments, an I/O proxy device 102 includes its own network interface(s) 116 that may be separate from other network interfaces of the computer system 100. In various embodiments, a network interface of the computer system 100 or a network interface 116 of the I/O proxy device 102 supports communication via any suitable wired or wireless data network, such as Ethernet (for example, 802.3), 802.11, IP-based networks, Fiber Channel, Infiniband, and the like. These network interfaces may support communication via telecommunications/telephony networks such as analog voice networks or digital fiber communications networks any other suitable type of network and/or protocol.

Interconnect(s) 110 coordinate I/O traffic between components of computer system 100, such as between hardware processing element(s) 104A, memory 118, network interface(s), the I/O proxy device 102, and any other components that may be coupled to interconnect(s) 110. Interconnect(s) 110 generally facilitate communication by a protocol that controls the timing, sequence, form, and content of data being exchanged among components. Example interconnects and protocols include QuickPath Interconnect (QPI), Peripheral Component Interconnect (PCI), Universal Serial Bus (USB), Small Computer System Interface (SCSI), Serial Attached SCSI (SAS), AT Attachment (ATA), Ethernet, variants or progeny of each, and the like. Multiple interconnects 110 may couple components of computer system 100. For example, some components may be connected with an I2C bus, others with a PCI bus, and others with both the PCI bus and the I2C bus. In some embodiments, bridges relay communications between different types of interconnects (for example, from one device on a first interconnect, through a bridge, to another device on a second interconnect).

In some embodiments, the hardware processing element(s) 104A and 104B of computer system 100 can include one or more special purpose (SP) processors. In embodiments with multiple SP processors, each SP processor may have a dedicated bank of memory or may share memory with other SP processor(s). Each SP processor might be an accelerator, coprocessor, field-programmable gate array (FPGA), application-specific integrated circuit (ASIC), or other processing device that can perform specialized operations (for example, graphics rendering, encryption and decryption, and so forth). In some embodiments, computer system 100 includes more than one type of SP processor.

In some embodiments, computer system 100 includes one or more local data storage devices 106. In some embodiments, local data storage devices 106 provide block storage via one or more logical volumes to software executing on the computer system 100, including to one or more customer compute instances that may be virtualized on computer system 100. Hardware processing elements 104A and 104B and/or other devices (for example, direct memory access (DMA) controllers, and so forth) can access local storage volume(s) to store and retrieve code and/or data. Local data storage devices 106 generally include non-transitory computer-readable media, such as magnetic disks, optical disks, flash memory devices, phase-change memory devices, RAM, ROM, and the like.

In some embodiments, a computer system 100 can additionally or alternatively access one or more remote and network-accessible data storage devices 108 via one or more network(s) 122. These remote, network-accessible data storage devices 108 similarly can provide block storage via logical volumes to software executing on the computer system 100, including to customer compute instances running on the computer system. In some embodiments, the use of network-accessible data storage devices 108 is managed using a storage service of a service provider network. In some embodiments, computer system 100 includes one or more other I/O devices that can store, process, and/or communicate code and/or data for computer system 100.

In an embodiment, a computer system 100 includes one or more I/O proxy devices 102. In some embodiments, each of the I/O proxy devices 102 is at a component interface to the computer system 100. For example, in FIG. 1, an I/O proxy device 102 resides between hardware processing elements 104A and one or more data storage devices (for example, local data storage devices 106, network-accessible data storage device(s) 108, or both). Although not shown, an I/O proxy device 102 may be included between any other I/O devices (if any) and the hardware processing elements 104A. In addition to interfacing to interconnect 110, the I/O proxy device 102 may include one or more network interfaces 116.

In an embodiment, the I/O proxy device 102 (including hardware processing elements 104B, I/O proxy device memory 124, and network interface(s) 116) is part of an "offload card" (for example, a PCI Express-based card) that is connected to the motherboard of the computer system 100, and the computer system 100 can include one or more such offload cards. For example, a computer system 100 can include one offload card that is connected to a control plane of a service provider network (via a network interface of the offload card) of which the computer system 100 is a part, and also include another offload card that is connected to a data plane network of the service provider network and that can be configured to perform the I/O message filtering operations described herein. In this example, the offload card connected to the control plane can receive filter configuration requests (for example, requests to create new filters, to modify existing filters, and so forth, from other components of the service provider network) and can configure the other offload card to implement the requested filters (for example, using a direct connection between the offload cards or other interfaces of the computer system to configure the filters). In other embodiments, both the control plane and filtering functionality can be implemented and performed using a single offload card.

In an embodiment, an I/O proxy device 102 executes software used to enable virtualization of the computer system 100 (for example, by executing customer compute instances) by offloading operations that would otherwise be performed by the other processor(s) in computer system 100 (for example, by hardware processing element(s) 104A). An example operation is coordinating shared resources amongst virtualization instances, such as in situations where multiple customer compute instances compete for access to a single device, such as a network interface. Another example operation is device emulation to enable software executing on a hardware processing element 104A to interact with one or more local data storage device(s) 106 or network-accessible data storage device(s) 108. In addition to offloading virtualization management from other processors in computer system 100 to the I/O proxy device 102, an I/O proxy device 102 can provide inter- and intra-system security to isolate compute instances that may be allocated to different customers and executing on different processors within computer system 100 and to isolate those instances from the remainder of a service provider network of which the computer system 100 may be a part. In an embodiment, the multi-tenant operation of the computer system 100 enables two or more different customers of a service provider network to concurrently run compute instances on the system. In systems executing multiple compute instances associated with one or more customers of a service provider network, I/O filters can be configured to apply to individual compute instances or to selected compute instances associated with one or more particular customers, while other I/O filters can be configured to apply to all customer instances running on a computer system.

In some embodiments, an I/O proxy device 102 includes functionality used to manage compute instances executing on computer system 100. Such management can include pausing and un-pausing compute instances, launching and terminating compute instances, performing memory transfer and copying operations, and so forth. In some embodiments, these operations are performed by a hypervisor that works with the I/O proxy device 102 that is executed by one or more other hardware processing elements 104A of the computer system 100 (for example, the hypervisor can direct the I/O proxy device 102 to create or destroy virtual devices for virtual machines on the server). In other embodiments, no hypervisor executes on the other hardware processing elements 104A of the computer system 100. In such embodiments, the hypervisor executed by the I/O proxy device 102 can accommodate requests from the other processors.

In some embodiments, program instructions and any other data for the hardware processing elements 104B of the I/O proxy device 102 is stored on an I/O proxy device memory 124 accessible by hardware processing element(s) 104B, similar to how system memory 118 stores program instructions and data accessible by hardware processing element(s)

104A, as described above. In an embodiment, the I/O proxy device memory 124 includes storage of I/O filters 112, and one or more I/O buffers 114 that are used to store I/O messages received by the I/O proxy device 102 and where I/O filters 112 can be applied, as described elsewhere herein.

Typically, the I/O messages used by computer system 100 software to interface with block devices, such as a local data storage device 106 or network-accessible data storage device 108, are packetized, with each I/O message packet possibly containing only a portion of the data requested (for example, if the requested data is larger than a block). For example, an operation of reading a file from a local data storage device 106 may involve a hardware processing element 104A sending many requests to read data from specified sectors or blocks of the data storage device, where common block sizes are 512 bytes, 1 kilobyte, or 4 kilobytes. In some embodiments, when a block of data is stored in memory (for example, after a read or pending a write), it is stored in a buffer containing only the single block of data. In the example of FIG. 1, where I/O messages pass through an I/O proxy device 102, the blocks may be stored in buffers 114 of the I/O proxy device memory 124. Here, a buffer 114 storing an I/O message serves as the object that represents a disk block in memory for the I/O proxy device 102. Because software operating on the I/O messages may expect some associated control information to accompany the I/O data (such as an indication of a block device from which a request originates, and which specific block the buffer represents), each buffer may be associated with a descriptor that identifies such information about the block.

In some embodiments, an I/O proxy device 102 can operate on I/O messages using "cut-through" processing techniques that do not rely on fully assembling and storing the I/O messages in a buffer 114. For example, the I/O proxy device 102 can instead process the I/O messages in a streaming fashion, where the device can begin operating on the messages as soon as a sufficient portion of the message is received (for example, as soon as an I/O message header is received indicating a message type and a destination of the message).

In some embodiments, a computer system 100 further includes a power supply and cooling subsystems (not shown). One or more of the processors described above can access a basic input output system (BIOS) or other low-level software program to obtain voltage level(s) output by the power supply, current levels sourced from the power supply, cooling fan speeds, temperature readings, and other environmental conditions.

As indicated above, a computer system 100 may at any point in time be executing one or more applications (for example, user applications) hosted by one or more guest operating systems, where these guest operating system(s) and application(s) execute on the hardware processing elements 104A. The guest operating system(s) have access to some hardware components (for example, via software driver(s)) and access to other hardware components via software executing on the I/O proxy devices 102. Access to I/O devices via an I/O proxy device 102 is generally transparent to the guest operating system(s) and user applications. For example, a guest operating system executing on a hardware processing element 104A can initiate an I/O request message to a local data storage device 106 as if it were in direct communication with the local data storage device via an interconnect 110, even through traffic between the hardware processing element 104A and local data storage device 106 is routed through the I/O proxy device 102.

According to embodiments described herein, a computer system 100 includes an I/O proxy device 102 that participates in the I/O communication path between one or more hardware processing element(s) 104A of the computer system 100 and one or more data storage devices (for example, local data storage device(s) 106, network-accessible data storage device(s) 108, or both). FIG. 1 illustrates an example of an I/O proxy device 102 receiving an I/O request message 120 generated by a hardware processing element 104A (for example, based on a request generated by a compute instance running on the hardware processing element 104A) and that is directed to a network-accessible data storage device 108, and applying one or more I/O filters 112 to the message. Although the particular example shown in FIG. 1 illustrates the application of one or more I/O filters to an I/O request message directed to a network-accessible data storage device 108, a similar process can be performed relative to I/O requests to other types of data storage devices, including local data storage device(s) 106. Furthermore, similar processes can be performed relative to I/O response messages received by an I/O proxy device 102 from a data storage device, as described in reference to FIG. 2 below.

In an embodiment, at circle "1," a compute instance (for example, a VM instance) running on the computer system 100 causes the hardware processing element 104A to generate an I/O request message 120 that is directed to a data storage device (a network-accessible data storage device 108 in the example of FIG. 1). For example, a user application that is executing upon the hardware processing element(s) 104A may perform operation(s) that involve reading data stored on a volume provided by a data storage device, writing data to a storage volume provided by a data storage device, or combinations of both. A user application request, for example, to read data that is stored at a data storage device may be processed by a guest OS hosting the user application, a hypervisor, or both, and which further causes a hardware processing element 104A to generate one or more I/O request messages 120 to perform the requested read operation(s). As indicated above, each I/O request message 120 can be packetized and include information identifying a storage location to which the request relates (for example, a physical page, a location of a block as an offset into the page, a length of the block from the given offset, and so forth), a type of operation (for example, a read or a write operation), data associated with the request (for example, a block of data to be written to the data storage device), among other possible information.

In an embodiment, at circle "2," the I/O request message 120 is received by the I/O proxy device 102 and optionally stored in a buffer 114 of the I/O proxy device memory 124. For example, the I/O proxy device 102 receives the request message 120 generated by a hardware processing element 104A via interconnect(s) 110 due to its interposition between the hardware processing element 104A and one or more data storage devices, as described above. In the example of an I/O request message 120 corresponding to a read operation, in some embodiments, a buffer 114 stores the message including an indication of a storage location from which data is requested or, in the example of a write operation, a buffer 114 stores the I/O request message 120 including a block of data to be written to a data storage device and an indication of a location at which the data is to be written. In other examples, the I/O message is processed in a streaming fashion and without storing an entire I/O message in a buffer 114.

At circle "3," the I/O proxy device 102 applies one or more I/O filters 112 to the I/O request message 120 stored in the buffer 114. According to embodiments described herein, the application of an I/O filter 112 to an I/O request message 120 includes determining whether at least a portion of the message satisfies one or more conditions associated with the filter and, if so, performing one or more actions specified by the filter. Several examples of conditions that can be specified by I/O filters and types of actions that can be performed by an I/O proxy device 102 in response to a message matching a filter are described below. The creation and configuration of I/O filters 112 at a computer system 100 is described in more detail in reference to FIG. 4.

In an embodiment, the application of I/O filters 112 can be performed by software executing on the hardware processing element(s) 104B of the I/O proxy device 102. For example, I/O filtering software may be a part of the packet processing software running on the I/O proxy device 102 or part of any other application running on the I/O proxy device and that is invoked whenever an I/O message (for example, an I/O request message 120) is received by the I/O proxy device. The I/O filtering software can apply the I/O filters 112 in any order (assuming more than one I/O filter is configured) or, in some embodiments, the I/O filters 112 are associated with an ordering that is followed by the I/O filtering software.

In some embodiments, one or more I/O filters 112 are configured such that portions of a volume contained on one or more data storage devices (for example, one or more local data storage device(s) 106 or network-accessible data storage device(s) 108) are non-readable, non-writable, or both, to any software executing on the hardware processing element(s) 104A of the computer system 100. For example, one I/O filter 112 might include conditions indicating one or more ranges of storage locations (for example, based on block offsets or other storage location identifiers) and further specify an action indicating that I/O request messages identifying a storage location in the defined range(s) are to be denied by the I/O proxy device 102.

As an example, when a user mounts a storage volume to a guest OS running on the computer system 100, the user or an application can analyze the data stored on the volume to identify portions of the volume storing data that the user desires to be non-readable, non-writable, or both. The analysis might indicate, for example, that all data below a particular offset of a storage volume contains OS-related files and other data that the user desires be non-writable to avoid possible corruption of critical system software. Thus, the user can create a I/O filter 112 with a condition that is satisfied whenever a storage location associated with an I/O write request is within the range of addresses containing the OS-related data. The filter can further specify an action that causes any such I/O write requests to be denied (that is, not passed along to the data storage device to which the request was directed). In this manner, even if the storage volume as a whole is mounted by the computer system 100 as a read/write volume, the I/O proxy device 102 prevents the portion of the storage volume containing the OS-related data from being modified by any software running on the computer system 100.

In an embodiment, I/O filters 112 can also be used to make selected files and directories that are part of a file system stored on a volume non-readable, non-writable, or both. For example, the I/O proxy device 102 can analyze I/O request messages 120 passing through the I/O proxy device 102 and determine when a requested read or write operation relates to one or more files or directories identified in an I/O filter (for example, a volume may be mounted read/write, but any attempt to overwrite selected files or directories associated with the OS are to be denied by the I/O proxy device 102). In some embodiments, when a prohibited read or write operation is denied by the I/O proxy device 102, the I/O proxy device 102 generates an I/O error message indicating to the OS that the prohibited operations failed, or the I/O proxy device 102 can deny the prohibited requests without notifying the OS.

In an embodiment, an I/O filter 112 configured to deny read and/or write requests to selected files or directories can be configured to identify when a selected file or directory is involved by analyzing patterns of I/O requests passing through the I/O proxy device 102 (for example, by monitoring a traversal of inodes in a file system to arrive at a particular file). In some embodiments, a driver or other agent can be installed in a guest OS or hypervisor running on the computer system 100 and that is configured to include additional information in I/O request messages received by the I/O proxy device 102 so that the proxy device can obtain additional information about the files and/or directories involved in particular I/O requests. In some embodiments, the driver or other agent can also include additional information related to the request that may not be present otherwise, such as a user associated with the request, an application associated with the request, and so forth, and this information can be used to selectively filter certain I/O requests.

In some embodiments, I/O filters 112 can be configured by a guest OS, hypervisor, or other application running on the computer system 100 or on an external system to dynamically apply read/write protection for particular storage location ranges and/or selected files/directories. For example, an OS or other application running on the computer system 100 can examine a storage volume attached to the computer system 100 to determine a layout of the applications and other data stored on the volume. Based on this information, the OS or other application can send application programming interface (API) calls or other suitable commands to the I/O proxy device 102 to create I/O filters 112 that prevent reads/writes to particular ranges of a volume depending on particular associated security configurations. The application can continue to monitor the file system to reconfigure I/O filters 112 as needed as files/directories are added, removed, or moved within the file system.

In some embodiments, the analysis and ongoing monitoring of the file system can be performed by a process that is external to the computer system 100 and associated storage devices, for example, by a service of a service provider network that has connectivity to both the computer system 100 and the storage devices. For example, a computer system 100 and/or associated storage device may be configured to send a journal or log of I/O messages to an external process that analyzes the information to identify parts of the file system to which filters are to be applied. The configuration of the external process can be managed by an administrator of the computer system 100 to specify particular I/O rules or files/directories that are to be protected. As another example, some filters can be pre-configured for certain types of applications that pre-allocate storage space to defined portions of a storage device. For example, a database administrator may pre-allocate storage space to be used by a database application and this information can be used to configure storage filters to protect some or all of the storage space to be used by the application. The database administrator or other user can use an API provided by a service provider network at which the database application is implemented to create one or more I/O filters that are based on the pre-allocated storage (for example, to create filters that specify actions relative to particular ranges of the pre-allocated storage space). In this example, the API requests to create the filters can be part of requests involved in configuring the database application or separate API requests using defined request methods for configuring I/O filters.

The examples above describe various ways in which I/O filters 112 can be used to manage read/write access to portions of a storage device based on storage locations identifiers or other information included in I/O requests received by the I/O proxy device 102. In some embodiments, I/O filters 112 can also be used to perform various actions based on analyzing the content of I/O messages, that is, the data included in messages to be written to a volume, or data included in a message retrieved by a read operation. For example, by receiving I/O messages exchanged between hardware processing element(s) 104A and various data storage devices, as shown in FIG. 1, the I/O proxy device 102 has access to the actual blocks of data either being read from or written to a storage device. In an embodiment, one or more I/O filters 112 can be used to monitor the computer system 100 for the exchange of I/O blocks containing personally identifiable information (PII) and other sensitive data, such as Social Security numbers (SSNs), credit card numbers, patient identifiers, and so forth.

As one example, an I/O filter 112 can be created such that the computer system 100 is unable read or write data to a data storage device if the data contains one or more unencrypted Social Security Numbers (SSNs) or other pattern of interest. For example, an I/O filter 112 can be created including a condition identifying a pattern that matches the format for SSNs and further indicating that if the operation is a write request and includes data matching the pattern, the I/O message is to be denied by the I/O proxy device 102. Thus, if any software application running on the computer system 100 attempts to store data containing an unencrypted SSN (for example, as mistakenly provided to a software application by a user using a web-based form generated by the application), the filter can cause the I/O proxy device 102 to deny the request. In other examples, instead of denying the request, an I/O filter 112 can be configured to replace or mask identified SSNs with other characters (for example, to replace the string "123-45-6789" with "XXX-XX-XXX"), to tokenize the SSNs (such that the original SSN can be recovered if detokenized), to encrypt the SSNs, or to perform any other desired operation to prevent the SSN data from being stored unencrypted. In some embodiments, because the data is typically persisted to a block storage device, the filter may perform only operations that preserve the length of the data to avoid causing data to shift across block boundaries.

As described in the examples above, I/O filters 112 generally are capable of operating on individual blocks of data contained in I/O messages and possibly stored in a buffer 114 of an I/O proxy device 102. In some embodiments, the efficiency of operating on the individual blocks stored in buffers 114 reflects a tradeoff relative to more sophisticated types of filtering that can be performed in other types of systems with access to more data, such as data loss prevention (DLP) systems. For example, an I/O filter 112 may generally be unable to perform types of filtering that are based on a user account associated with requests because an associated user account typically is not evident from an individual I/O block. Similarly, an I/O proxy device 102 may not be able to filter I/O requests based on an association with a particular process, application, or any system characteristics that are not identifiable based on an individual block of data. However, in other embodiments, an I/O proxy device can maintain some amount of state information in the I/O proxy device 102 that enables the device to perform types of filtering that involve data contained in more than one I/O message. In other embodiments, as described above, a driver or other agent executing on the computer system 100 can include additional information related to the request that may not be present otherwise, such as a user associated with the request, an application associated with the request, and so forth, so that the I/O proxy device 102 can perform more sophisticated types of filtering.

In one embodiment, an I/O filter 112 can be configured to monitor I/O messages for the presence of "honeytokens," which can include fictitious data (for example, words, phrases, numbers, records) added to a legitimate data set stored a data storage device. For example, a storage volume may include a database storing sensitive data and which may be configured with honeytokens to enable identification and tracking of data that leaves the storage device. In this example, an I/O filter 112 can be configured to identify the presence of honeytokens in I/O messages and to take various actions such as generating log data indicating that the honeytoken was seen, sending a notification to an external component, and so forth.

In many of the examples above, an I/O filter 112 is configured with one or more actions that, in one way or another, directly affect the I/O messages to which the filter applies—for example, by denying the request from passing through the I/O proxy device 102, by overwriting one or more portions of the data contained in the request, and so forth. In some embodiments, one or more I/O filters 112 can additionally or alternatively include actions that passively interact with I/O messages matching defined filter conditions. For example, instead of denying I/O write requests that involve a storage location within a defined range of storage locations, or modifying a portion of an I/O message containing data matching a defined pattern, an I/O filter 112 can be configured to allow I/O such messages to pass through the device unaltered but to also generate log data, notifications, or take other actions without interrupting the flow the messages in the system. Referring again to the example of a web server that is intended to never write data containing unencrypted SSNs, if the web server software attempts to write a stream of log data including SSNs (or credit card numbers, patient IDs, telephone numbers, or any other type of sensitive data) to a data storage device, the I/O proxy device 102 can generate log data that can be analyzed by other processes to possibly remediate the issue. The log data generated by the I/O proxy device 102 can include varying amounts of information, for example, possibly indicating only that an undesirable operation occurred or providing more detailed information including an identifier of the filter that matched the I/O message, the contents of the I/O message, the storage location identified by the I/O message, and so forth.

In an embodiment, one or more I/O filters 112 can be configured with actions that involve processing by components or services external to the computer system 100. For example, an I/O filter 112 may be configured to send I/O messages, or portions thereof, that match the filter to an external application or service for processing that may be too time- or resource-intensive to be performed by the I/O proxy device 102 locally. In this manner, the I/O messages matching the filter can be performed "out-of-band" while the I/O proxy device 102 passes the messages through with minimal overhead. As another example, an I/O filter 112 may be configured, when an I/O message matches the filter, to send a request to an external service requesting that a snapshot of the relevant data storage device be generated for possible subsequent analysis.

In an embodiment, at circle "4" in FIG. 1, the I/O proxy device 102 optionally sends a filtered I/O request message 126 to the data storage device to which the I/O message initially was directed (assuming the I/O message does not match a filter with an associated action that causes the I/O message to be denied passage by the I/O proxy device 102). In other examples, if the I/O request message 120 received from the hardware processing element 104A does not match any of the I/O filters 112, an unfiltered I/O request message is sent instead.

Figure 2:
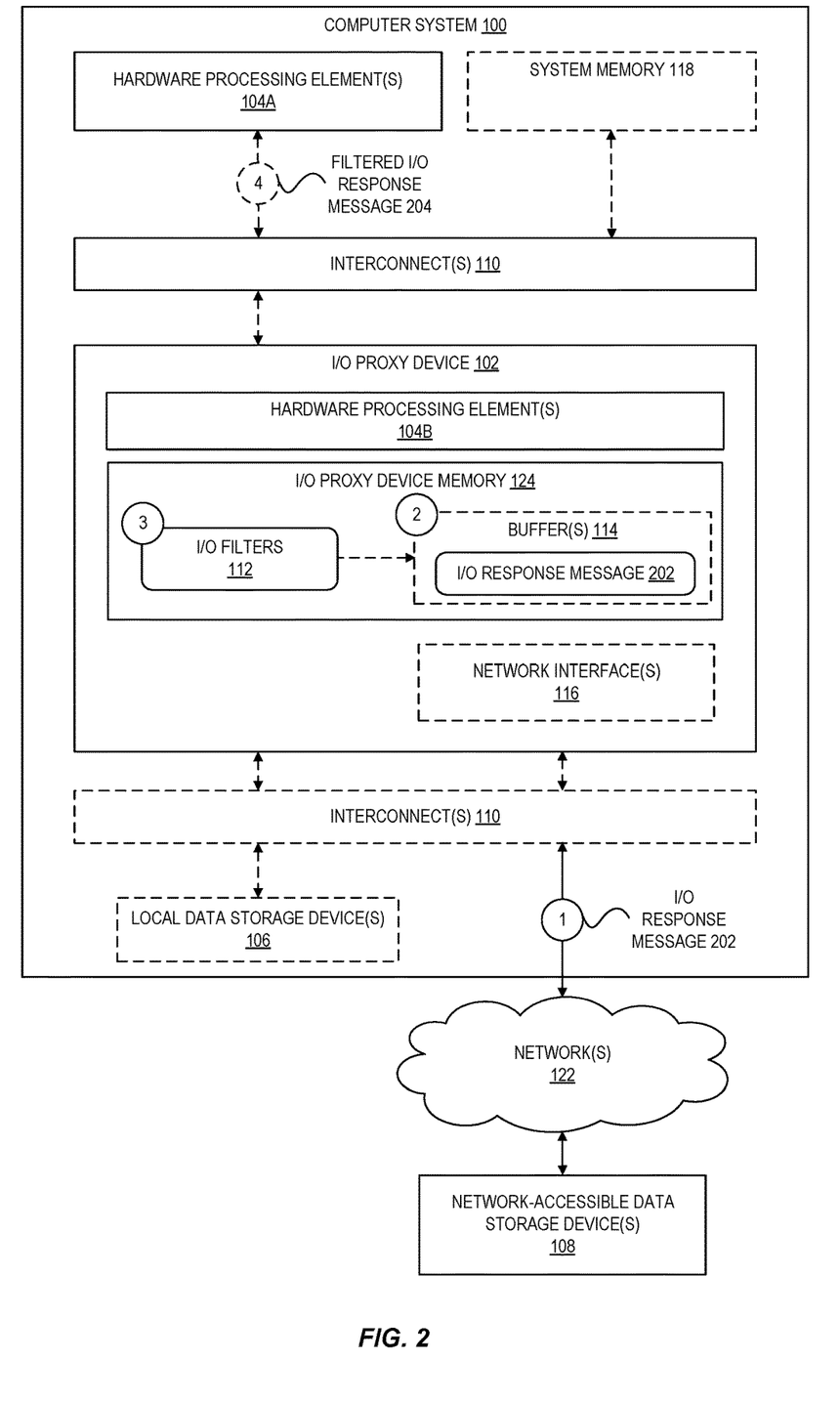
FIG. 2 is a block diagram illustrating a computer system including an I/O proxy device that uses I/O filters to perform various actions relative to I/O response messages generated by a local or remote data storage device and directed to a compute instance running on the computer system according to some embodiments.

FIG. 2 is a block diagram similar to FIG. 1 and illustrating a computer system including an I/O proxy device 102 that uses I/O filters 112 to perform various actions relative to I/O response messages 202 received from one or more data storage devices (for example, one or more local data storage devices 106 and/or network-accessible data storage device(s) 108).

In an embodiment, at circle "1," a data storage device generates an I/O response message that is directed to a compute instance running on a hardware processing element of the computer system. For example, the data storage device may generate a response message that returns a block of data requested by a previously issued read request, or the I/O message may indicate the status or other information related to a previously requested write operation.

At circle "2," the I/O response message is received by the I/O proxy device 102 and optionally stored in a buffer 114 of the I/O proxy device. Similar to the I/O proxy device 102 shown in FIG. 1, the I/O proxy device receives the response message 202 due to its interposition between the one or more data storage devices and hardware processing element(s) 104A. In the example of an I/O message responsive to a requested read operation, the buffer 114 stores the I/O response message including a block of data read from a data storage device.

At circle "3," the I/O proxy device 102 applies one or more I/O filters 112 to the I/O response message 202 stored in the buffer 114. In an embodiment, the application of an I/O filter 112 to an I/O response message 202 includes determining whether at least a portion of the message satisfies one or more conditions associated with the filter and, if so, performing one or more actions specified by the filter. Similar to the application of I/O filters 112 described above in relation to FIG. 1, the I/O filters can be used to deny access to response messages 202 containing particular patterns of data, to deny access to response messages involving storage locations within a specified range of storage locations, to mask, tokenize, or otherwise modify data matching one or more defined patterns, and so forth.

At circle "4," the I/O proxy device 102 optionally sends a filtered I/O response message 204 to the compute instance running on the hardware processing element 104A to which the I/O message was directed (assuming the I/O message does not match a filter that causes the I/O message to be denied passage by the I/O proxy device 102).

Figure 3:
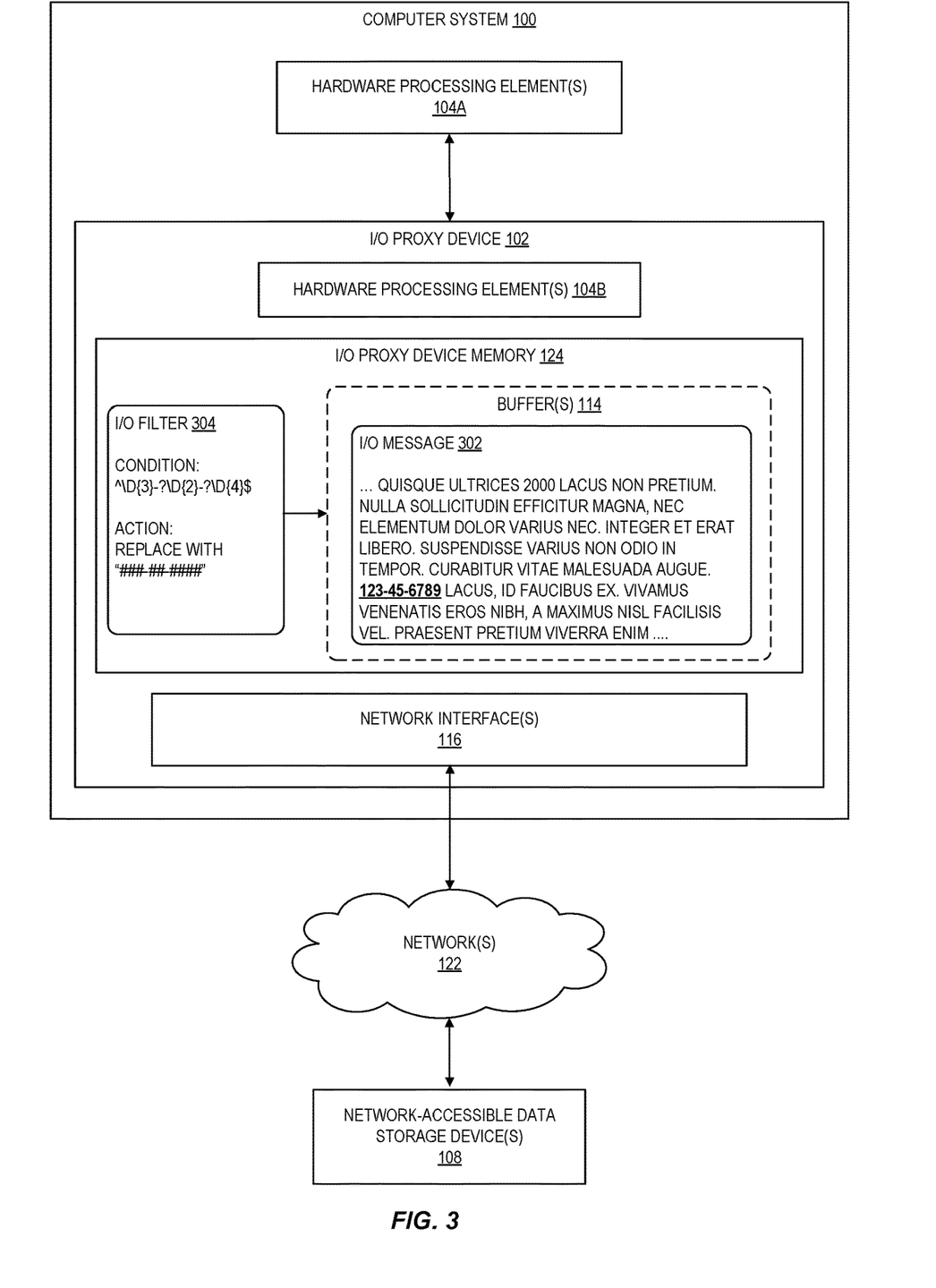
FIG. 3 is a block diagram illustrating an example I/O message stored in a data buffer of an I/O proxy device upon which filters can be applied according to some embodiments.

FIG. 3 is a block diagram illustrating a data buffer storing an example I/O message upon which an example I/O filter can be applied according to some embodiments. For example, the I/O message 302 shown in the buffer 114 of the I/O proxy device 102 in FIG. 3 includes a block of data retrieved from a network-accessible data storage device 108 (or a local data storage device, in other examples). In the example shown in FIG. 3, an I/O filter 304 includes a condition represented by a pattern that matches SSNs (for example, the regular expression "^\d{3}-?\d{2}-?\d{4}$")$_a$nd further includes an action indicating that data matching the pattern is to be replaced with the string "###-##-####." As shown in FIG. 3, the I/O message 302 includes a single identified instance of an SSN ("123-45-6789") shown in bold and underlined text and thus, before sending the I/O message 302 on to a hardware processing element 104A, the I/O proxy device 102 masks the digits of the SSN using the "#" character. In this manner, software running on the hardware processing element(s) 104A of the computer system 100 is unable to access plaintext SSNs which may be stored on a data storage device. In some embodiments, similar processing can be performed without storing an entire I/O message in a buffer and instead performed in a streaming fashion as data passes through an I/O proxy device 102.

Figure 4:
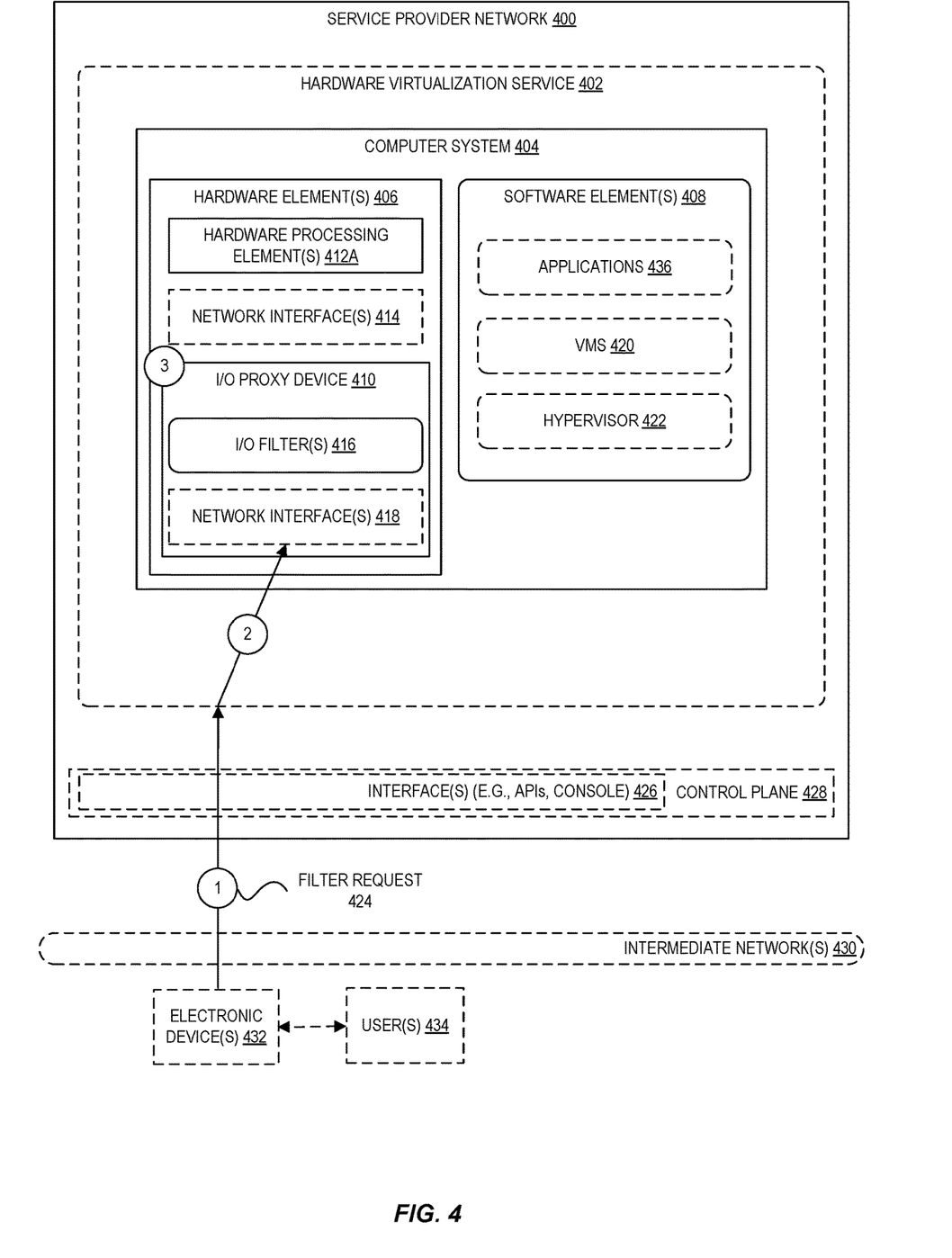
FIG. 4 is a block diagram illustrating service provider network including a hardware virtualization service providing computer systems at which I/O filters can be configured according to some embodiments.

FIG. 4 is a block diagram illustrating an environment for creating and configuring I/O filters used by a computer system according to some embodiments. In some embodiments, a computer system 404 is part of a service provider network 400. A service provider network 400 generally provides users with the ability to use one or more of a variety of types of computing-related resources such as compute resources (for example, executing virtual machine (VM) instances and/or containers, executing batch jobs, executing code without provisioning servers), data/storage resources (for example, object storage, block-level storage, data archival storage), network-related resources (for example, configuring virtual networks including groups of compute resources, content delivery networks (CDNs), Domain Name Service (DNS)), application resources (for example, databases, application build/deployment services), and so forth. These and other computing resources may be provided as services, such as a hardware virtualization service 402 that can execute compute instances on computer systems such as computer system 404, a storage virtualization service that can store data objects, and so forth. The users (or "customers") of provider networks 400 (such as user(s) 434) may use one or more user accounts that are associated with a customer account, though these terms can be used somewhat interchangeably depending upon the context of use. Users may interact with a provider network 400 using electronic device(s) 432 and across one or more intermediate networks 430 (for example, the internet) via one or more interface(s) 426, such as through use of API calls, via a console implemented as a website or application, and the like. The interface(s) 426 may be part of, or serve as a front-end to, a control plane 428 of the service provider network 400 that includes "backend" services supporting and enabling the services that may be more directly offered to customers.

To provide these and other computing resource services, service provider networks often rely upon virtualization techniques. For example, virtualization technologies may be used to provide users the ability to control or utilize compute instances (for example, a VM 420 using a guest OS that operates using a hypervisor 422 that may or may not further operate on top of an underlying host OS, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network 400 to perform a variety of computing tasks and to execute a variety of applications 436, or may indirectly utilize a compute instance by submitting code to be executed by the provider network, which in turn utilizes a compute instance to execute the code (typically without the user having any control of or knowledge of the underlying compute instance(s) involved).

As indicated above, it is desirable at times for users 434 of a service provider network 400 to create, modify, and remove I/O filters 416 associated with a computer system 404 (which includes various hardware element(s) 406 and software element(s) 408). For example, at circle "1," a hardware virtualization service 402 receives a filter request 424 indicating that a user desires to add, modify, or remove an I/O filter 416 at a computer system 404. For example, the user 434 may use a web-based graphical user interface (GUI), command-line interface (CLI), or other interface to view compute instances associated with the user, to create and configure various I/O filters desired by the user (including the specification of the associated conditions and actions), and to deploy configured I/O filters to one or more relevant computer systems 404.

In an embodiment, a filter request 424 is an API request using an API that provides various request methods for managing I/O filters, where the API can be implemented by a particular service of the service provider network (for example, a hardware virtualization service or storage service), by the service provider network generally, by the computer system to which the request pertains, or any other component of the service provider network. In some embodiments, a filter request 424 can be part of another type of request related to a computer system 404. For example, an API request received by a hardware virtualization service 402 to launch a VM 420 on the computer system 404, or a request received by a storage service to create or modify a block storage volume, can include additional information used to configure one or more I/O filters at a computer system 404. As one example, a "create VM" API request sent to a hardware virtualization service can include additional information specifying one or more I/O filters to be configured at a computer system 404 in association with the VM to be created, and the specified I/O filters can be configured at the computer system by interfacing with an offload card of the computer system. As another example, a "create block storage volume" API request used to create a storage volume at a storage service of the service provider network 400 can include additional I/O filter configuration information that causes a component of the provider network 400 to send one or more additional requests to a computer system 404 to configure the requested filters (for example, by interfacing with an offload card of the system).

In an embodiment, I/O filters can be associated with one or more particular computer systems 404, with particular VMs 420 running on one or more computer systems 404, with particular users or security groups (which in turn may be associated with one or more VMs 420 and computer systems 404), with particular data storage devices or volumes mounted or to be mounted by a VM 420, with particular VM or volume images that can be deployed to a computer system 404 or data storage device, respectively, and so forth. A filter request 424 thus can be routed by the service provider network 400 and hardware virtualization service 402 to one or more particular computer systems 404 depending on the components to which the filter applies.

In one embodiment, an I/O filter 416 can be associated with a volume stored on one or more data storage devices provided by a storage service. In this example, any attempt by a VM 420 or other OS running on any computer system 404 in the service provider network 400 to mount the volume involves installing the associated filter on the computer system 404. In this manner, a volume can be configured with a filtered view or access to the data stored on the volume that follows the volume as it is mounted by various computer systems. In other embodiments, an I/O filter can be associated with a snapshot of a volume such that any attempt to create a copy of the volume based on the snapshot results in the addition of the associated filters to any computer system mounting the volume. In some examples, the filter request 424 can include a request to mount a volume to an instance associated with the user 434, or a request to add, remove, or modify a filter associated with an already mounted volume.

At circle "2," the filter request 424 is routed by the hardware virtualization service 402 (or other service of the provider network 400 receiving the filter request 424) to the computer system 404. As indicated above, the request 424 can be routed to one or more particular computer systems 404 depending on the association of the filter with a particular user, VM, computer system, volume, or so forth. In an embodiment, depending on other options selected by the user 434, the request can also include an indication that a drive is to be mounted with one or more identified I/O filters.

In some embodiments, the filter request 424 can be sent directly to an API endpoint provided by the I/O proxy device 410 or by a separate offload card of the computer system coupled to a control plane of the service provider network (for example, accessed via a network interface 418 of an offload card of which the I/O proxy device 410 is a part). For example, the filter request 424 can be formatted by the hardware virtualization service 402 as a Concise Binary Object Representation (CBOR) message transmitted to the computer system 404 using the Transport Layer Security (TLS) protocol, or using any other format and protocol accepted by the computer system 404. In other embodiments, the filter request 424 can be sent to the computer system 404 and processed by a hypervisor 422, a VM 420, or any other software executing on the hardware processing element(s) 412A, which in turn sends the filter request 424 (or a modified version thereof) over an interconnect (for example, a PCI interconnect) to the I/O proxy device 410. In this example, the I/O proxy device 410 may include a set of one or more registers that are reserved for passing messages between the hypervisor 422 and the I/O proxy device 410.

In an embodiment, at circle "3," the filter request 424 is received and processed by software running on the I/O proxy device 410. For example, depending on the type of request, software running on the I/O proxy device 410 can add the filter to the set of I/O filters 416 currently in use by the I/O proxy device 410, modify an existing filter, or remove an existing filter. Once installed, the I/O filter 416 can be used by software running on the I/O proxy device 410 to filter I/O messages, as described above with respect to FIGS. 1-3.

Figure 5:
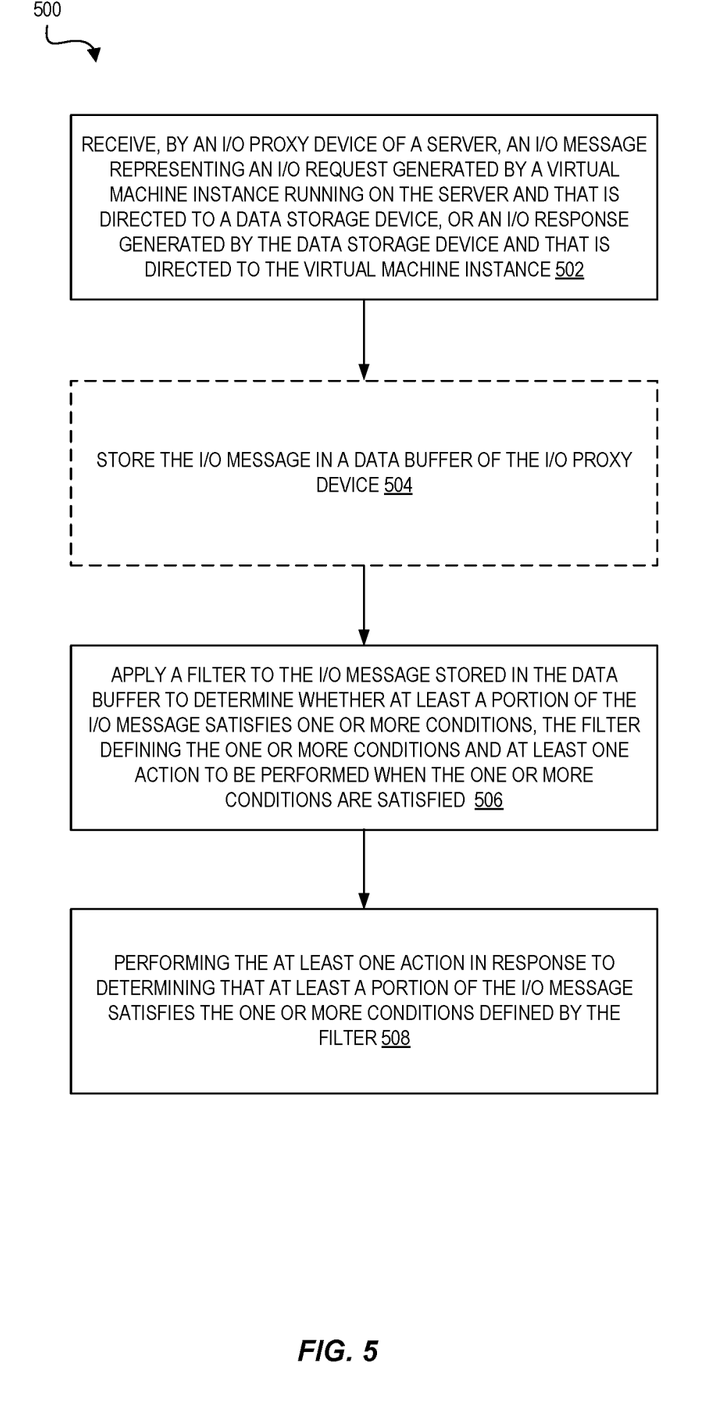
FIG. 5 illustrates operations of a method performed by an I/O proxy device to apply I/O filters to I/O messages received by the I/O proxy device according to some embodiments.

FIG. 5 is a flow diagram illustrating operations 500 performed by an I/O proxy device to apply I/O filters to I/O messages received by the I/O proxy device according to some embodiments. Some or all of the operations 500 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by an I/O proxy device of the other figures.

The operations 500 include, at block 502, receiving, by an I/O proxy device located in a communication path between at least one hardware processing element and at least one data storage device, an I/O message representing an I/O request or an I/O response. In one embodiment, the I/O proxy device is coupled to the at least one hardware processing element by an interconnect and coupled to the at least one data storage device. Referring to FIG. 1, for example, an I/O proxy device 102 is located in a communication path between one or more hardware processing element(s) 104A and one or more data storage device (such as, for example, one or more local data storage device(s) 106 or network-accessible data storage device(s) 108). The I/O proxy device 102 is coupled to the hardware processing element(s) 104A and data storage devices by one or more interconnects 110. As shown in FIGS. 1 and 2, the I/O proxy device 102 can receive I/O messages generated by either a compute instance running on the hardware processing element 104A or by a data storage device.

The operations 500 further optionally include, at block 504, storing the I/O message in a data buffer of the I/O proxy device. For example, the I/O proxy device 102 shown in FIGS. 1 and 2 can store I/O messages received by the device in a buffer 114 that is stored in the I/O proxy device memory 124. In other embodiments, the I/O message is not stored in a buffer and instead processed in a streaming fashion.

The operations 500 further include, at block 506, applying a filter to the I/O message to determine whether at least a portion of the I/O message satisfies one or more conditions, the filter defining the one or more conditions and at least one action to be performed in response to the one or more conditions being satisfied. For example, software running on the hardware processing element(s) 104B of the I/O proxy device 102 shown in FIGS. 1 and 2 can apply one or more I/O filters 112 to the I/O messages optionally stored in the buffer(s) 114. In an embodiment, the application of an I/O filter 112 includes determining whether at least a part of the I/O message satisfies the one or more conditions defined by the filter.

The operations 500 further include, at block 508, performing the at least one action in response to determining that at least a portion of the I/O message satisfies the one or more conditions. In one embodiment, the one or more conditions include determining whether the I/O message identifies a storage location in a defined range of storage locations, and wherein the at least one action includes denying the I/O message in response to determining that the storage location is within the defined range of storage locations.

In one embodiment, the one or more conditions include determining whether at least a portion of the I/O message matches a defined pattern, and wherein the at least one action includes one or more of: overwriting data contained in the I/O message, tokenizing data contained in the I/O message, masking data contained in the I/O message, denying the I/O message, generating log data related to the I/O message, sending a notification to an external component.

In one embodiment, the I/O proxy device receives a request to create a new filter, the request including data specifying one or more conditions associated with the new filter and at least one action to be performed. The I/O proxy device is configured to use the new filter for subsequent I/O messages. In one embodiment, the I/O proxy device receives a request to modifying an existing filter, the request including data specifying one or more of: one or more updated conditions to be associated with the existing filter, and at least one updated action to be performed. The I/O proxy device modifies the existing filter. In one embodiment, the filter is applied to I/O messages associated with one or more specified data storage volumes stored at the at least one data storage device. For example, a request to create a new filter or to modify an existing filter can be an API request that is processed by a service of a service provider network of which the computer system is a part or by the computer system directly. As another example, the request to create a new filter or to modify an existing filter can be part of a request to create or modify a storage volume provided by a storage service of a service provider network.

In one embodiment, the I/O proxy device implements an API including request methods to perform one or more of: mounting a data storage volume with one or more filters, associating one or more additional filters with a mounted data storage volume, modifying one or more filters associated with a mounted data storage volume. In an embodiment, applying the filter to the I/O message includes determining that the I/O message involves a specified file or directory stored at the at least one data storage device. In one embodiment, the I/O proxy device is part of a server that is coupled to a control plane of a service provider network, and the server receives requests to configure filters at the I/O proxy device via the control plane.

In one embodiment, the I/O message includes metadata indicating one or more of a user associated with the I/O message, a file associated with the I/O message, an application associated with the I/O message, and wherein applying the filter includes analyzing the metadata to determine whether the I/O message satisfies the one or more conditions.

Figure 6:
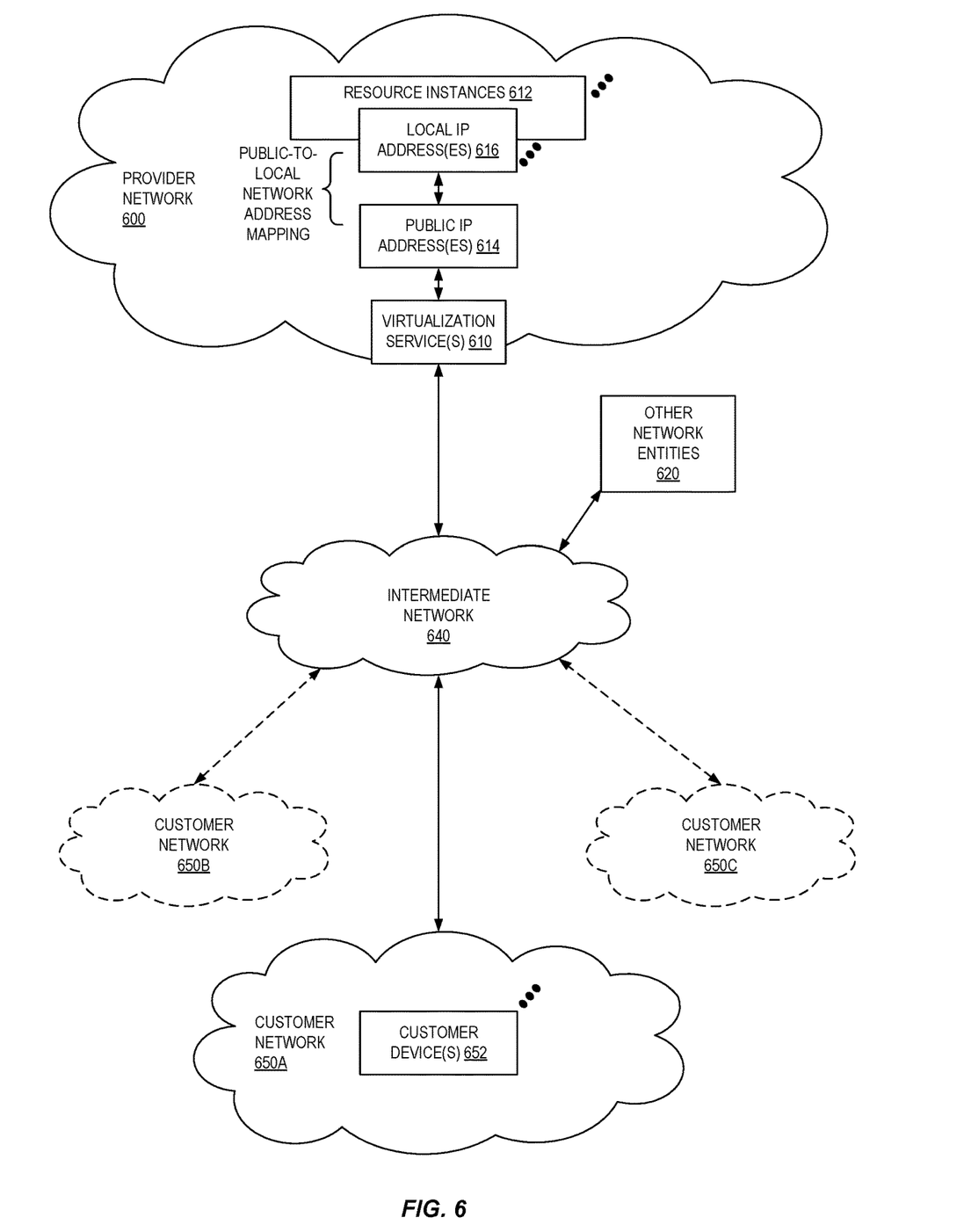
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local IP addresses 616 may be associated with the resource instances 612; the local IP addresses are the internal network addresses of the resource instances 612 on the provider network 600. In some embodiments, the provider network 600 may also provide public IP addresses 614 and/or public IP address ranges (for example, Internet Protocol version 4 (IPv4) or Internet Protocol version 6 (IPv6) addresses) that customers may obtain from the provider 600.

Conventionally, the provider network 600, via the virtualization services 610, may allow a customer of the service provider (for example, a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
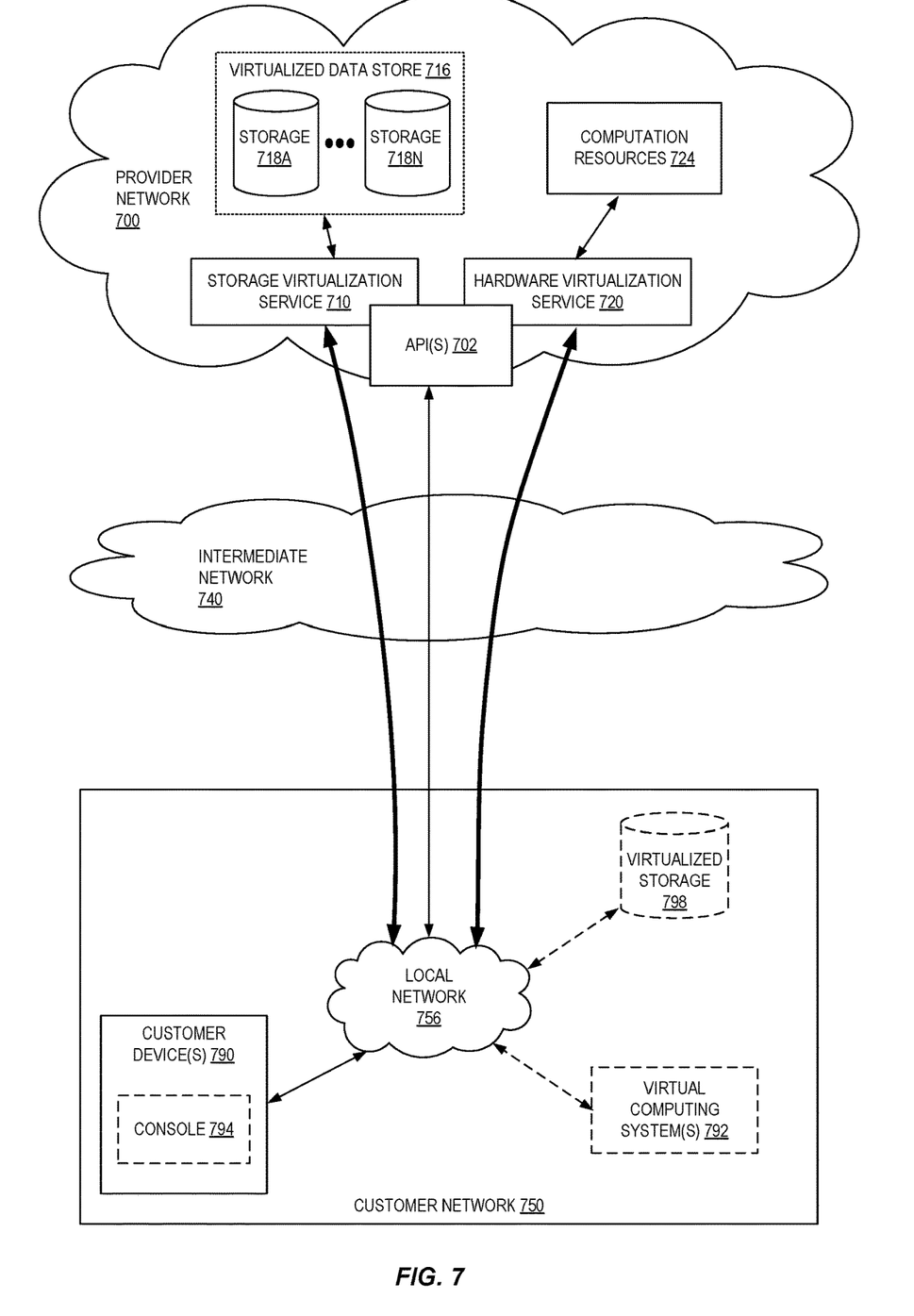
FIG. 7 is a block diagram of an example provider network that provides a storage virtualization service and a hardware virtualization service to customers according to some embodiments.

FIG. 7 is a block diagram of an example provider network that provides a storage virtualization service and a hardware virtualization service to customers, according to some embodiments. Hardware virtualization service 720 provides multiple computation resources 724 (for example, VMs) to customers. The computation resources 724 may, for example, be rented or leased to customers of the provider network 700 (for example, to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (for example, a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (for example, via console 794), the customer may access the functionality of storage virtualization service 710, for example via one or more APIs 702, to access data from and store data to storage resources 718A-718N of a virtual data store 716 provided by the provider network 700. In some embodiments, a virtualized data store gateway (not shown) may be provided at the customer network 750 that may locally cache at least some data, for example frequently accessed or critical data, and that may communicate with virtualized data store service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes, which appear to the user as local virtualized storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (for example, large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (for example, 104A-104B) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (for example, A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method performed by an input/output (I/O) proxy device including a first hardware processing element and first memory, the I/O proxy device coupled to a data storage device and an interconnect of a server including a second hardware processing element and second memory that is separate from the first hardware processing element and first memory, the method comprising:
    receiving, by the server, a request to configure a filter to be used by the I/O proxy device, wherein the server is coupled to a control plane of a service provider network over which the request is received, and wherein the I/O proxy device is located in a communication path between a compute instance running on the server and at the data storage device;
    receiving, by the I/O proxy device, an I/O message representing an I/O request generated by a virtual machine instance running on the server and that is directed to the data storage device;
    storing the I/O message in a data buffer of the I/O proxy device;
    applying the filter to the I/O message stored in the data buffer, wherein the filter specifies an action of denying I/O messages relating to data stored within a defined range of storage locations, and wherein applying the filter includes determining that the I/O message relates to data stored within the defined range of storage locations specified by the filter; and
    denying the I/O message from passing through the I/O proxy.

2. The computer-implemented method of claim 1, wherein the I/O message is a first I/O message and the filter is a first filter, and wherein the method further comprises:
    receiving a second I/O message;
    storing the second I/O message in the data buffer of the I/O proxy device;
    applying a second filter to the second I/O message stored in the data buffer, wherein applying the second filter includes determining that at least a portion of the second I/O message matches a defined pattern, and
    performing an action that includes at least one of: overwriting data contained in the I/O message, tokenizing data contained in the I/O message, masking data contained in the I/O message, denying the I/O message, generating log data related to the I/O message, or sending a notification to an external component.

3. A computer-implemented method comprising:
    receiving, by a server coupled to a control plane of a service provider network, a request to configure a filter to be used by an input/output (I/O) proxy device including a first hardware processing element and first memory, wherein the I/O proxy device is located in a communication path between a compute instance running on the server and a data storage device providing block storage for the compute instance, and wherein the server includes a second hardware processing element and a second memory that is separate from the first hardware processing element and first memory;
    receiving, by the I/O proxy device, an I/O message representing an I/O request;
    applying the filter to the I/O message, wherein the filter specifies an action of denying I/O messages relating to data stored within a defined range of storage locations, and wherein applying the filter includes determining that the I/O message relates to data stored within the defined range of storage locations specified by the filter; and
    denying the I/O message from passing through the I/O proxy device.

4. The computer-implemented method of claim 3, wherein the I/O proxy device applies a plurality of filters to the I/O message in a defined ordering of the plurality of filters.

5. The computer-implemented method of claim 3, wherein the I/O message includes metadata added by a software agent running on the server, and wherein the metadata includes at least one of: a user associated with the I/O message, an application associated with the I/O message, or an indication of a storage location to which the I/O message relates.

6. The computer-implemented method of claim 3, wherein the I/O proxy device stores state data related to the I/O message, and wherein the state data is used to process at least one other I/O message received by the I/O proxy device.

7. The computer-implemented method of claim 3, wherein the filter is applied to data contained in a header of the I/O message, wherein the data indicates a message type and a storage location associated with the I/O message.

8. The computer-implemented method of claim 3, wherein the I/O message is a first I/O message and the filter is a first filter, and wherein the method further comprises:
receiving a second I/O message;
applying a second filter to the second I/O message, wherein applying the second filter includes determining that at least a portion of the second I/O message matches a defined pattern; and
performing an action that includes at least one of: overwriting data contained in the I/O message, tokenizing data contained in the I/O message, masking data contained in the I/O message, denying the I/O message, generating log data related to the I/O message, or sending a notification to an external component.

9. The computer-implemented method of claim 3, wherein the server receives, via the control plane, requests to configure a plurality of filters at the I/O proxy device and configures the I/O proxy device accordingly.

10. The computer-implemented method of claim 3, wherein the server provides compute resources as part of a hardware virtualization service of a service provider network, and wherein the service provider network uses the data storage device to provide one or more block storage volumes as part of a storage service.

11. The computer-implemented method of claim 10, further comprising:
receiving, by the service provider network, a request to create a new filter, the request including data specifying one or more conditions associated with the new filter and at least one action to be performed; and
configuring the I/O proxy device to use the new filter for subsequent I/O messages.

12. The computer-implemented method of claim 10, further comprising:
receiving, by the service provider network, a request to modify an existing filter, the request including data specifying one or more of: one or more updated conditions to be associated with the existing filter, and at least one updated action to be performed; and
modifying the existing filter at the I/O proxy device.

13. The computer-implemented method of claim 3, wherein the filter is applied to I/O messages associated with one or more specified data storage volumes provided by a storage service of a service provider network.

14. The computer-implemented method of claim 3, wherein the I/O proxy device implements an application programming interface (API) including request methods to perform one or more of: mounting a data storage volume with one or more filters, associating one or more additional filters with a mounted data storage volume, and modifying one or more filters associated with a mounted data storage volume.

15. The computer-implemented method of claim 3, wherein applying the filter to the I/O message includes determining that the I/O message involves a specified file or directory stored at the data storage device.

16. The computer-implemented method of claim 3, wherein the I/O message includes metadata indicating at least one of: a user associated with the I/O message, or a file associated with the I/O message, an application associated with the I/O message, and wherein applying the filter includes analyzing the metadata to determine whether the I/O message satisfies the one or more conditions.

17. A system comprising:
a first hardware processing element coupled to an interconnect of a server, wherein the server is coupled to a control plane of a service provider network;
a data storage device; and
an I/O proxy device including a second hardware processing element, wherein the I/O proxy device coupled to the interconnect and to the data storage device, wherein the I/O proxy device is located in a communication path between a compute instance running on the server and the data storage device providing block storage for the compute instance, and wherein the I/O proxy device includes instructions that upon execution cause the I/O proxy device to:
receive a request to configure a filter to be used by the I/O proxy device;
receive an I/O message representing an I/O request generated by a virtual machine instance running on the server and that is directed to the data storage device;
apply a filter to the at least a portion of the I/O message, wherein the filter specifies an action of denying I/O messages relating to data stored within a defined range of storage locations, and wherein applying the filter includes determining that the I/O message relates to data stored within the defined range of storage locations specified by the filter; and
deny the I/O message from passing through the I/O proxy device.

18. The system of claim 17, wherein the I/O message is a first I/O message and the filter is a first filter, and wherein execution of the instructions further causes the I/O proxy device to:
receive a second I/O message;
apply a second filter to the second I/O message, wherein applying the second filter includes determining that at least a portion of the second I/O message matches a defined pattern; and
perform an action that includes at least one of: overwriting data contained in the I/O message, tokenizing data contained in the I/O message, masking data contained in the I/O message, denying the I/O message, generating log data related to the I/O message, or sending a notification to an external component.

19. The system of claim 17, wherein the I/O proxy device further includes instructions that upon execution cause the I/O proxy device to:
receive, by the I/O proxy device, a request to create a new filter, the request including data specifying one or more conditions associated with the new filter and at least one action to be performed; and
store the new filter to be used for subsequent I/O messages.

20. The system of claim 17, wherein the I/O proxy device implements an application programming interface (API) including request methods to perform one or more of: mounting a data storage volume with one or more filters, associating one or more additional filters with a mounted data storage volume, and modifying one or more filters associated with a mounted data storage volume.

* * * * *